United States Patent [19]
Bechu

[11] Patent Number: 5,183,099
[45] Date of Patent: Feb. 2, 1993

[54] MOTOR VEHICLE WINDSHIELD WASHER SYSTEM

[75] Inventor: Jean-Pierre Bechu, Courbevoie, France

[73] Assignee: Caoutchouc Manufacture et Plastiques S.A., Versailles, France

[21] Appl. No.: 662,288

[22] Filed: Feb. 28, 1991

[30] Foreign Application Priority Data

Feb. 28, 1990 [FR] France ............... 90 02613

[51] Int. Cl.$^5$ .................... F28F 1/12; B05B 1/10
[52] U.S. Cl. ......................... 165/41; 165/169; 239/284.1
[58] Field of Search ............ 165/41, 169; 239/129, 239/169, 284.1

[56] References Cited

U.S. PATENT DOCUMENTS

| | | | |
|---|---|---|---|
| 2,894,265 | 7/1959 | Reardon | 239/129 X |
| 4,562,890 | 1/1986 | Matoba | 165/169 X |
| 4,575,003 | 3/1986 | Linker et al. | |
| 4,593,753 | 6/1988 | McConnel | 239/129 X |
| 4,903,760 | 2/1990 | Joshi et al. | 165/169 X |

FOREIGN PATENT DOCUMENTS

| | | |
|---|---|---|
| 0005414 | 11/1979 | European Pat. Off. . |
| 0243216 | 10/1987 | European Pat. Off. . |
| 0271821 | 6/1988 | European Pat. Off. . |
| 2642301 | 3/1978 | Fed. Rep. of Germany . |
| 2129629 | 10/1972 | France . |
| 2389520 | 1/1978 | France . |
| 2406177 | 5/1979 | France . |
| 2416142 | 8/1979 | France . |
| 2436045 | 4/1980 | France . |
| 2447302 | 8/1980 | France . |
| 2605273 | 4/1988 | France . |
| 132675 | 7/1978 | Taiwan . |

*Primary Examiner*—Andres Kashnikow
*Assistant Examiner*—Kevin Weldon
*Attorney, Agent, or Firm*—Nils H. Ljungman and Associates

[57] ABSTRACT

A windshield washer fluid heater, on the engine cooling circuit of an automobile, with an exchange coil 7 around a rigid internal tube 1 which connects the flexible hoses 2 and 3. The exchanger coil 7 is embedded in the polymer material constituting the external envelope element 6 of the flexible hoses 2 and 3. Application to the windshield washing devices of automotive vehicles.

18 Claims, 6 Drawing Sheets

MOTOR VEHICLE WINDSHIELD WASHER SYSTEM

BACKGROUND OF THE INVENTION

1. Field of the Invention

The invention relates to a heat exchanger for heating the water in a windshield washer system of an automotive vehicle, in which the heat exchanger makes use of the engine cooling system.

2. Background Information

Among the accessories designed to improve the ease, convenience and safety of driving an automobile, the washing of windshields by spraying water improves the action of the windshield wipers to such an extent that windshield washing systems have become standard equipment on modern vehicles. However, such systems can become completely useless at temperatures below zero degrees Celsius, because the spray nozzles tend to ice up. This lower temperature limit can be reduced by the use of an antifreeze liquid. Nevertheless, numerous inventions have proposed the heating of windshield washer fluid, thereby improving the effectiveness of the washing. Even if an antifreeze eliminates the risk of the icing of the nozzles, there is an even more serious risk, which is the instantaneous icing of the fluid sprayed on a windshield which is too cold. In such an instance, the windshield may become dangerously opaque.

Therefore, a proper heating of the washer fluid is highly desirable, between the washer fluid reservoir under the hood, where the fluid is stored, and the sprayer nozzles. An electric pump controlled by the driver is often located in the cover of the reservoir, or may be located further away, for example, on a circuit consisting of plastic tubes, e.g. industrial nylon polyamide.

The known art relating to devices for heating windshield washer fluid includes heating means employing electrical resistance, such as those described in Fed. Republic of Germany Patent No. 2,642,301 (Becker) or U.S. Pat. No. 4,575,003 (Hotshot Auto Products). The latter patent discloses heating by electrical resistance in combination with a tap from the automobile cooling circuit.

These devices have the disadvantage that they require a safety regulation to limit the heating of the resistance. Most of the other inventions, proposed in this field, use the engine cooling circuit as the heat source, which is itself regulated to a temperature which does not risk any damage if the windshield washing fluid remains at this temperature for a long time. French Patent No. 2,389,520 (Hagus C. Luchtenberg) discloses an adaptable exchanger, plated by a contact surface on, or held substantially tightly against, an existing radiator. French Patent No. 2,447,302 (Ferodo) discloses the modification of the coolant tank in the radiator. French Patent No. 2,436,045 (P. Auteroche) proposes that an exchanger be fitted to the radiator cap or even to the crankcase. These three patents, therefore, disclose additional devices which are added to the cooling circuit, and do not attempt to modify the cooling circuit as designed by the automobile designer. These additional devices are difficult to incorporate in an assembly line of a manufacturing system and do not readily lend themselves to easy installation in a manufactured automobile. Furthermore, the devices are generally incompatible with the production requirements of the automobile industry.

Other patents disclose the incorporation of an accessory in the standard coolant circulation circuit. For example, French Patent No. 2,605,273 (Valeo) discloses a spiral-shaped deformable bellows threaded around the coolant hose and French Patent No. 2,416,142 (P. Auteroche) discloses an interposed metal sleeve comprising a tubular coil. The device disclosed in French Patent No. 2,129,629 (Nitterl) performs the same function, that is, receiving heat from coolant fluid, on the reheating circuit of the carburetor. Likewise, French Patent No. 2,406,177 (Kepler) and European Patent No. 0,271,821 (Muller) disclose the incorporation of a box in the coolant circuit. Such a box is generally made of two parts assembled with a seal, and contains a tubular coil, coiled in spiral fashion around an engine coolant line where water or coolant fluid circulates, without interfering with the full cross section of the flow of the water or coolant fluid. The box in the patent to Kepler is a metal box stamped and assembled by brazing or welding, and includes an arrangement of graduated cylinders which allows for the box to be fitted to various tube diameters. The box in the patent to Muller is preferably formed of half-cylinders made of cast aluminum. The box may be bolted tight and the coil tube may be fastened by connections with O-rings and tightened in a substantially radial direction.

The devices of the known art, therefore, require additional connections of flexible hoses to rigid accessories. Such additional connections are precisely what automobile designers in general wish to avoid, given all the problems, caused by collars and other connectors. Such problems may include the ultimate removal and replacement of such collars and connectors. The cost of additional accessories, the cost of collars, the process of cutting the tubes to the correct length and any additional labor required for installation and repair of any accessories can make the overall operation generally undesirable, since the operation involves an altogether auxiliary function. At best, in such an operation, the added value of such an auxiliary function may be moderate.

Seeking reliability at low cost, the entity to which Applicant will assign this invention has obtained European Patent No. 0,243,216, which relates to a device for the tapping and/or connection of flexible lines in coolant liquid circuits or other fluids on automobile vehicles. The invention disclosed in this European patent is based on a hooping effect on the extremities of flexible coolant lines by the contraction of an external envelope of rigid polymer, which is essentially a plastic. This fitting makes it possible to connect tubes of identical or different diameters, to connect tubes of different materials, to attach taps or make "T" connections, and to install economical bleed fittings.

OBJECT OF THE INVENTION

The object of the present invention is the use of similar technology to incorporate a heat exchanger, introduced at very low cost, in a diameter reduction device, "T" connection, bleed fitting, or other interconnection device, junction device, or tap fitting already required by the installation of the cooling circuit. The heat exchanger, therefore, heats the windshield washer fluid by virtue of a positioning which modifies the installation of the fluid circuits as little as possible.

SUMMARY OF THE INVENTION

The invention substantially comprises a windshield washer fluid heater located on the engine cooling circuit of an automotive vehicle. The heater preferably includes at least one heat exchanger coil made of a substantially rigid tube wound in spiral fashion around the line through which line the engine coolant is circulating. The circuit preferably includes a tap and/or connecting device for flexible hoses disposed between a rigid internal tube and a surrounding external element made of a polymer material. The polymer material may be elastomeric, thermoplastic or thermosetting in nature. Each of the elastomeric, thermoplastic and thermosetting types of polymer material is essentially a plastic.

The invention is characterized by the fact that the heat exchanger coil, located around a rigid internal tube, is substantially embedded in the polymer material constituting the surrounding external element.

One aspect of the invention resides broadly in a windshield washer system for a motor vehicle having an internal combustion engine with an engine coolant system for cooling the engine and for directing heated fluid to a heat exchanger, the coolant system having a plurality of coolant hoses and at least one connection device for connecting at least two of the coolant hoses, the windshield washer system comprising a hose arrangement for conducting windshield washer fluid to a windshield, the windshield washer system comprising: the washer fluid hose arrangement being configured to interface with the coolant system at least at one of the at least one connection device; the washer fluid hose arrangement comprising at least one heat exchanger coil for transferring heat from the coolant system to the washer fluid hose system; the coolant system comprising at least a first coolant hose end and a second coolant hose end; at least one of the at least one connection device comprising an internal tube connecting at least the first coolant hose end and the second coolant hose end; at least one of the at least one connection device comprising an external envelope disposed about the first coolant hose end, the second coolant hose end and the internal tube; the at least one heat exchanger coil being disposed around the internal tube and being disposed adjacent the internal tube along a substantial length of the at least one heat exchanger coil; and a substantial portion of the at least one heat exchanger coil being substantially embedded within the external envelope.

Another aspect of the invention resides broadly in a windshield washer system hose connector for connecting sections of hose in an engine cooling system for a motor vehicle having a windshield washer system, which windshield washer system comprises an arrangement of windshield washer fluid hoses for providing windshield washer fluid to a windshield, the hose connector comprising: an internal tube for connecting a first hose end and a second hose end; the hose connector being configured to receive the first hose end and the second hose end; the internal tube comprising a first end and a second end; the first hose end for being disposed to substantially surround at least a portion of the first end of the internal tube; the second hose end for being disposed to substantially surround at least a portion of the second end of the internal tube; an external envelope being disposed around the internal tube; the external envelope for being disposed around the first hose end and the second hose end; at least one heat exchanger coil for containing windshield washer fluid, the at least one heat exchanger coil being disposed around the internal tube to receive heat from the internal tube for heating the windshield washer fluid; the at least one heat exchanger coil being disposed adjacent the internal tube along a substantial length of the at least one heat exchanger coil; the at least one heat exchanger coil for being disposed between the first hose end and the second hose end; and a substantial portion of the at least one heat exchanger coil being embedded within the external envelope.

Yet another aspect of the invention resides broadly in a method of making a windshield washer system hose connector for connecting sections of hose in an engine cooling system for a motor vehicle having a windshield washer system, which windshield washer system comprises an arrangement of windshield washer fluid hoses for providing windshield washer fluid to a windshield, the washer fluid hose arrangement being configured to interface with the coolant system at least at the hose connector, the washer fluid hose arrangement comprising at least one heat exchanger coil for transferring heat from the coolant system to the washer fluid hose system, the coolant system comprising at least a first coolant hose end and a second coolant hose end, the hose connector comprising: an internal tube having a first end and a second end, the internal tube connecting at least the first coolant hose end and the second coolant hose end; an external envelope disposed about the first coolant hose end, the second coolant hose end and the internal tube; the at least one heat exchanger coil being disposed around the internal tube and being disposed adjacent the internal tube along a substantial length of the at least one heat exchanger coil; and a substantial portion of the at least one heat exchanger coil being substantially embedded within the external envelope; the method of making the hose connector comprising the steps of: disposing the at least one heat exchanger coil around the internal tube and adjacent the internal tube along a substantial length of the at least one heat exchanger coil; mounting the first coolant hose end on the first end of the internal tube; mounting the second coolant hose end on the second end of the internal tube; the at least one heat exchanger coil being disposed between the first coolant hose end and the second coolant hose end; placing the first coolant hose end, the second coolant hose end, the internal tube and at least a substantial portion of the at least one heat exchanger coil in a mold; injecting a plastic material into the mold such that the plastic material flows: between the turns of the at least one heat exchanger coil; over a substantial portion of the at least one heat exchanger coil; over at least a substantial portion of the first coolant hose end; over at least a substantial portion of the second coolant hose end; and about the internal tube; and hardening the plastic material in the mold to hold the at least one heat exchanger coil, the first coolant hose end, the second coolant hose end and the internal tube substantially within the external envelope.

BRIEF DESCRIPTION OF THE DRAWINGS

The invention is explained below in greater detail with reference to the accompanying drawings, in which:

FIGS. 5a and 5b illustrate a case, under substantially the same conditions as the other figures, in which the cooling circuit is equipped with an air bleed screw, and wherein FIG. 5a is an axial cross section and FIG. 5b is an orthogonal cross section; and FIGS. 6a, 6b and 6c show another variant with a single lateral tap on the cooling circuit, wherein FIG. 6a is an axial cross section, FIG. 6b is a detailed view of a portion of FIG. 6a and FIG. 6c is an orthogonal cross section.

DESCRIPTION OF THE PREFERRED EMBODIMENTS

Figure 1:
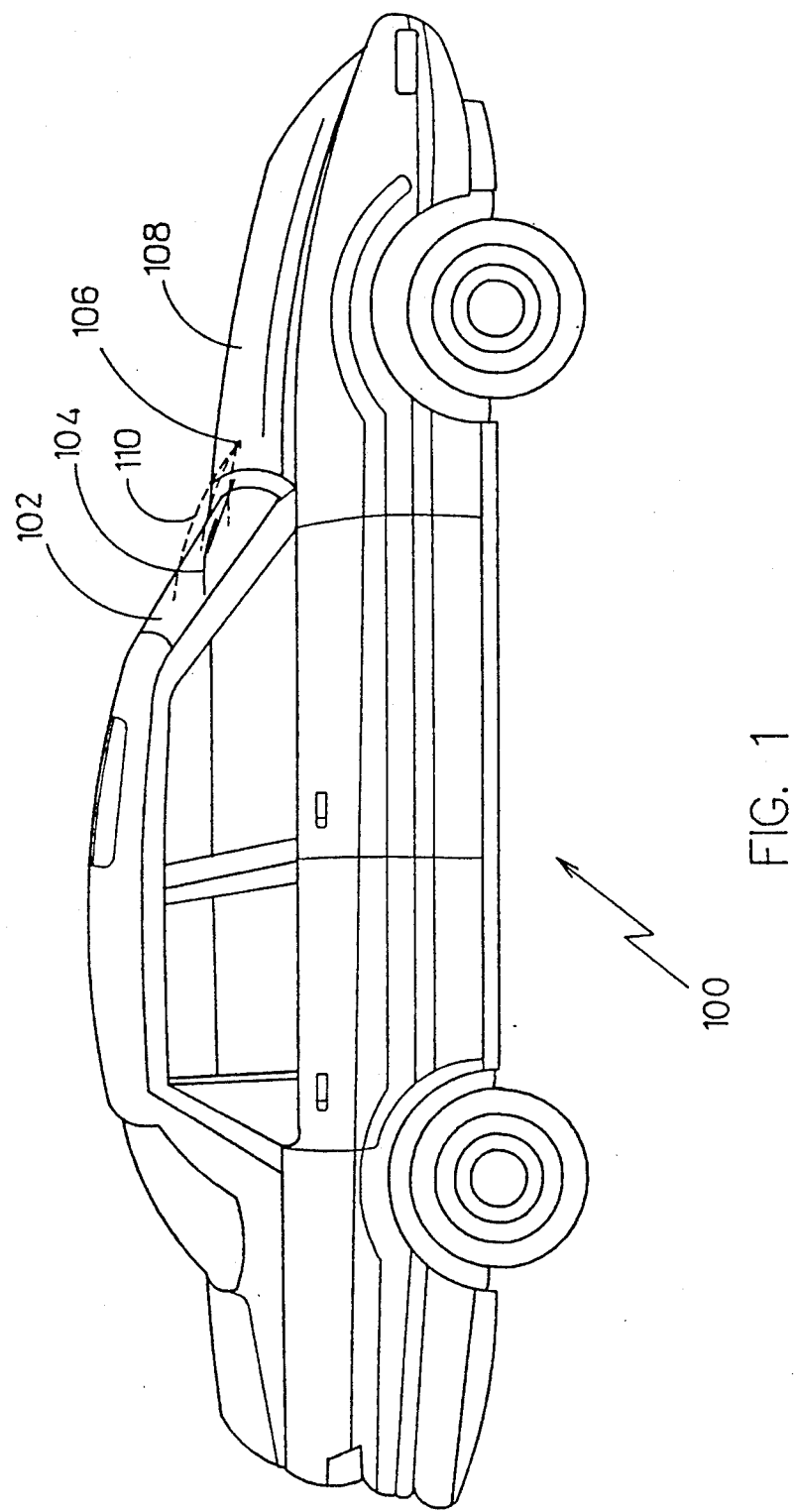
FIG. 1 is a side elevational view of an automobile which may incorporate the device of the present invention.

FIG. 1 shows an automobile 100 which includes a front windshield 102 and windshield wipers, or washers 104. Washer fluid nozzles 106 are shown disposed on hood 108 a short distance from windshield 102. As shown, the nozzles are preferably oriented such that a quantity of washer fluid 110 may be discharged therefrom and be deposited on the external surface of windshield 102.

Figure 2:
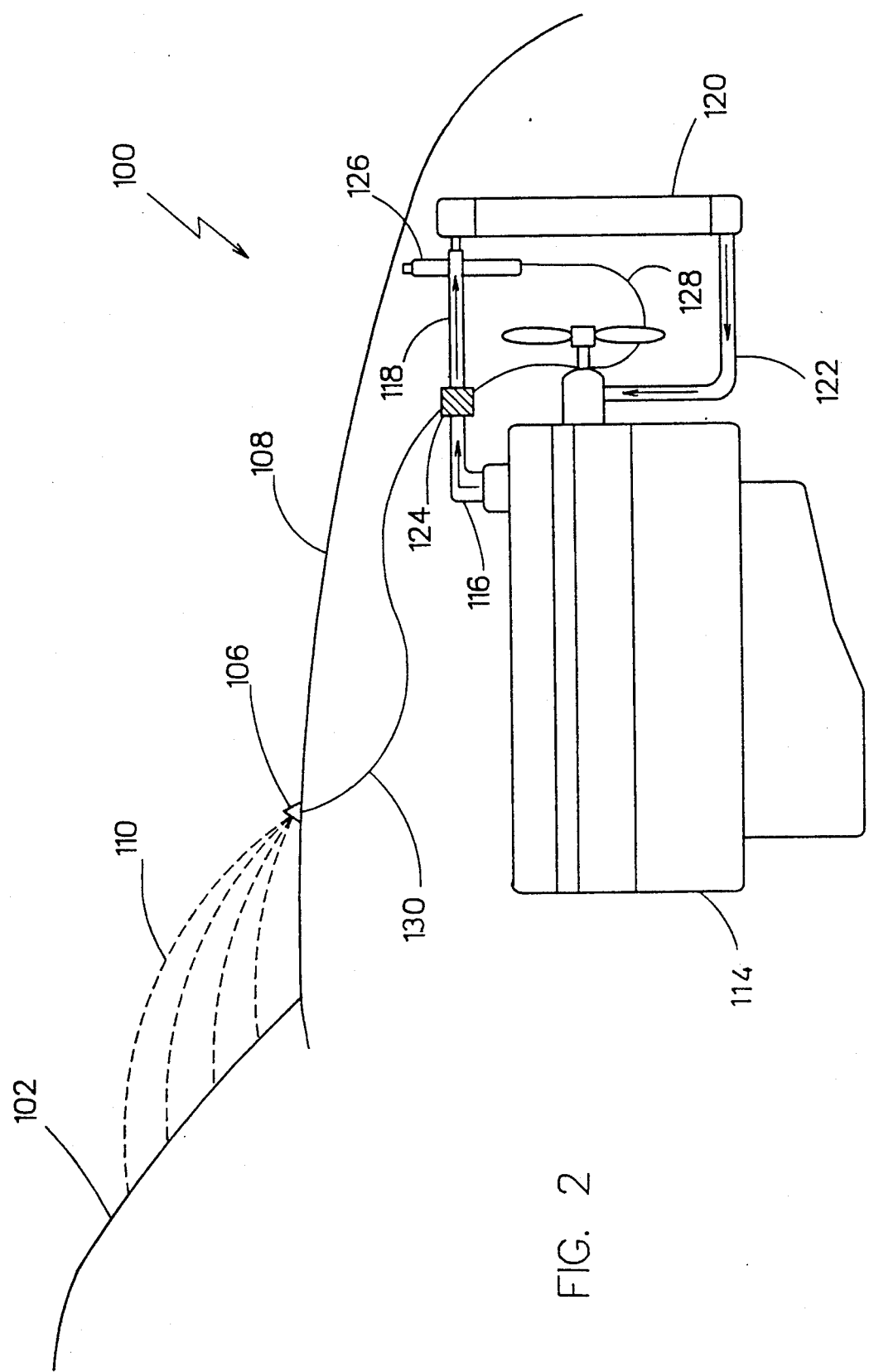
FIG. 2 is a schematic illustration of an automobile and an internal combustion engine in conjunction with a possible layout of the windshield washer system of the present invention.

FIG. 2 shows, schematically, a possible layout of internal combustion engine 114 within automobile 100, as well as a portion of an engine coolant circuit and a windshield washer system. A radiator inlet hose, divided into two segments 116 and 118, a radiator 120 and a radiator outlet hose 122 constitute at least part of the engine coolant circuit. The radiator inlet hose, whose segments 116 and 118 may consist of a flexible material, such as rubber, is shown to route coolant from engine 114 to radiator 120, while the radiator outlet hose 122 is shown to route coolant from radiator 120 to engine 114. A connection device 124 connects hose segments 116 and 118. Examples of such a connection device are illustrated in FIGS. 3a-6c and will be described in detail further below. A system for the provision of washer fluid to windshield 102 includes a washer fluid reservoir 126 and two segments 128 and 130 of a washer fluid line, wherein the first segment 128 leads from the reservoir 126 to connection device 124 and the second segment 130 leads from the connection device 124 to washer fluid nozzles 106. As will be described in detail further below, connection device 124 includes a device for heating the washer fluid. It should be understood that the layout shown in FIG. 2 is primarily schematic in nature, and furthermore presents just one possible example of a layout for the windshield washer fluid heating system of the present invention. As will be discussed more fully below, the connection device 124 may also be a diameter reduction device, "T" connection, bleed fitting, or other interconnection device, junction device, or tap fitting already required by the installation of the cooling circuit. Furthermore, as will also be discussed more fully below, the location of the connection device 124 is not limited to that shown in FIG. 2.

Turning to the remaining figures, it should be noted that the drawings contained in FIGS. 3a-6c are all drawn on a substantially similar scale, which scale may be between about 0.5 and about 2 times the actual size of the components shown therein. The dimensions and proportions thereof are substantially illustrated to scale from one point to the other thereof.

Figure 3A:
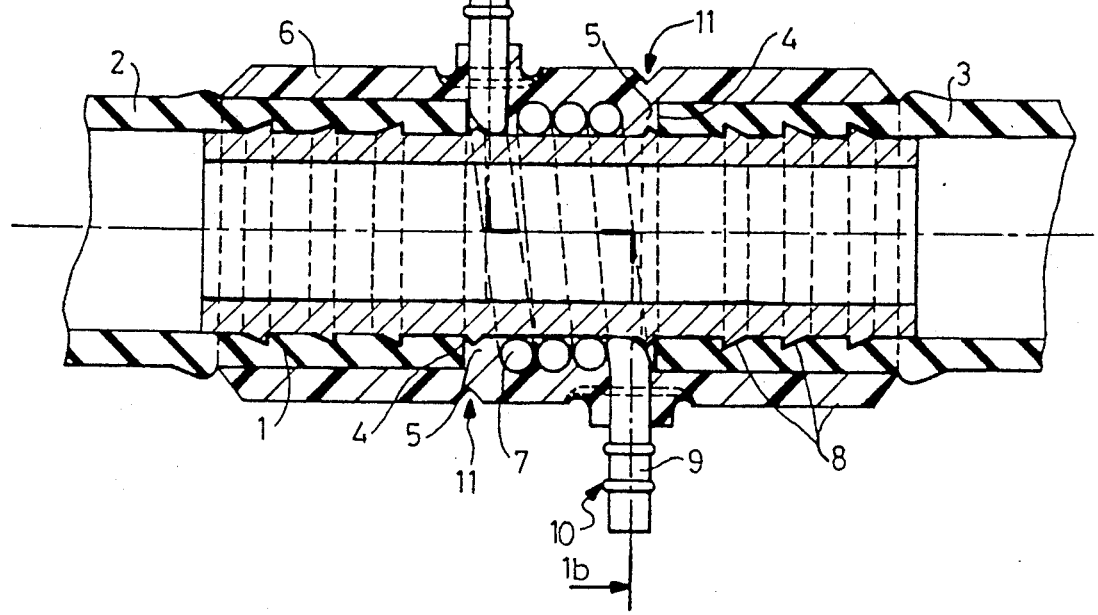
FIGS. 3a and 3b are, respectively, an axial cross section and an orthogonal cross section of a tube connecting two flexible lines of substantially the same diameter and equipped with a heat exchanger coil according to the invention.
Figure 3B:
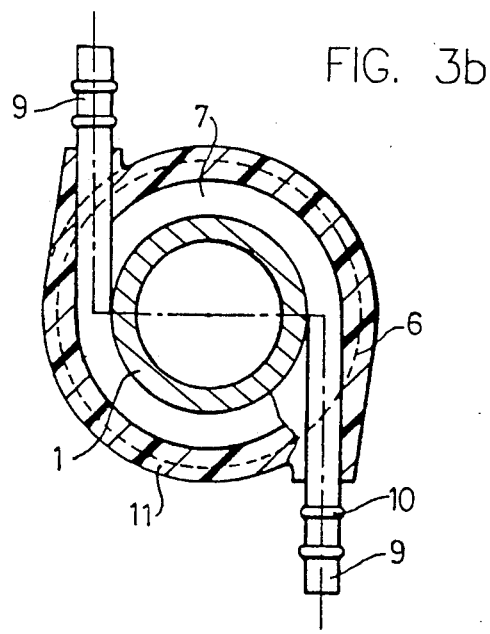

FIG. 3a is an axial cross section and FIG. 3b is a perpendicular or orthogonal cross section of a simple connection between two tubes of the same diameter, required, for example, to link an elbow followed by a long tube. In such a configuration, as shown as in FIGS. 3a and 3b, the tubes may be made of different materials on account of different thermal environments, such as, for example, the proximity of an overflow manifold. A rigid internal tube 1 and an external envelope element 6, described more fully below, together constitute an example of the connection device 124 shown in FIG. 2.

The rigid internal tube 1, having been previously fitted, connects flexible hoses 2 and 3. The hoses 2 and 3, by means of their plane surfaces 4, preferably come in contact against the exchanger coil 7.

In the variant shown, the spiral forming the exchanger coil 7 substantially consists of three and one-half turns of a small-diameter rigid tube, wherein the tube is preferably made of metal. Preferably, this rigid tube, having contiguous turns in this simple variant, is advantageously made of copper-plated steel tubes used elsewhere in automobiles either as brake lines or as rigid sections of a fuel line. Additionally, as shown, the thickness of the flexible hoses 2 and 3 may be between about 0.5 and about 2 centimeters and that of the rigid internal tubing 1 may also be between about 0.25 and about centimeter. The length of the rigid internal tubing may be between about 5.2 and about 20.8 centimeters. Furthermore, the diameter of the small-diameter rigid tube forming the exchanger coil 7 may also be between about 0.25 and about 1 centimeter.

During the molding of the assembly substantially made up of the rigid internal tubing 1 equipped with the exchanger coil 7, wherein the extremities of the flexible hoses 2 and 3 are mounted on the internal tubing 1, a cylindrical shoulder 5 is formed by the polymer material of the external envelope element 6. The shoulder 5 simultaneously confines the exchanger coil 7 and the ends of the flexible hoses 2 and 3. Additionally, the shoulder 5 provides a seal for the fluids.

The inside diameter of the exchanger coil 7 is preferably shaped on a mandrel so as to allow for easy installation around the rigid internal tube 1. The rigid internal tube 1 may be equipped with grooves or protrusions 8 to improve the subsequent attachment of the flexible hoses 2 and 3.

As shown, the grooves or protrusions 8, preferably eight in number, are configured to displace the material of flexible hoses 2 and 3, and thus become embedded in the material. In this way, the flexible hoses 2 and 3 may be held more firmly onto the rigid internal tube 1.

It may be noted that the spiral configuration of the exchanger coil 7 may be likened to the configuration of a French horn. Thus, the torsional elasticity of such a "French horn" configuration makes it possible to cross the grooves 8 and to allow the exchanger coil 7 to serve as an abutment or stop for the flexible hoses 2 and 3.

FIG. 3b, in two partial cross sections perpendicular to the axis of revolution of the line carrying the coolant, shows two tangential outlets 9 of the exchanger coil 7. The precise position of the outlets 9 is obtained by fixing them in place when the mold forming the external envelope element 6 is closed. Provided about the periphery of each tangential outlet 9, where the windshield washer hose is fitted on the vehicle during assembly, is at least one groove or protrusion 10. Each such groove may be termed an "olive-shaped groove". These olive-shaped grooves 10 allow for a better hold of the windshield washer hose on the tangential outlets 9. Preferably, the hose is most frequently made of industrial polyamide.

Generally, in the present invention, the temperature is deliberately kept higher than in the usages of the known art. This higher temperature may require a better fastening, by hot molding, by a plastic adhesive reinforcement or by means of a metal circlip, to form a collar on the windshield washer hose where the exchanger coil 7 is most frequently interposed between an electric pump for the windshield washer fluid system and the sprayer nozzles 106. Preferably, the location of the washer fluid heater device is selected with an eye toward the least possible modification of the coolant circuits, and preferably in their zone of greatest physical proximity to, or as close as otherwise possible to, the sprayer nozzles 106, to preferably provide the most effective protection against the tubes becoming blocked by ice.

The external envelope element 6 is preferably made either of a polymer material of the elastomeric type, whose reticulation occurs during the molding operation, or of a thermoplastic or thermosetting polymer material. It should be appreciated that each of the elastomeric, thermoplastic and thermosetting types of polymer material is essentially a plastic. If a polymer is used which experiences a significant geometric shrinkage during cooling, i.e. equal to or greater than about 1% of its initial diameter, then two grooves 11 are preferably provided in the thickness of the external envelope element 6.

The permanent elastic stress exerted by the extremities of the flexible hoses 2 and 3 due to the geometric shrinkage of the external envelope element 6 could be counteracted by the support provided by the central cylindrical portion 12 of the external envelope element 6 across the exchanger coil 7. During molding, the polymer material substantially impregnates the spiral of the exchanger coil 7 and substantially fills all the indentations, chinks and other irregularities on the plane faces 4 of the flexible hoses 2 and 3 resulting from cutting. Thus, the excess thickness forming the cylindrical shoulder 5 exerts a severe stress on the central part of the rigid internal tubing 1 during cooling. The existence of the two grooves 11 generally allows, with some elastic deformability, a volumetric elasticity difference between the flexible hoses 2 and 3. The flexible hoses 2 and 3 are held in place by the external envelope 6 and by the central cylindrical portion 12 of the external envelope 6, in which central portion the exchanger coil 7 is embedded.

Consequently, the central cylindrical portion 12 of the external envelope element 6 is intimately bonded, over a large surface area, onto the rigid internal tubing 1. The rigid internal tubing preferably consists of a rigid polymer material, resistant to the molding pressure, such as a 6—6 polyamide reinforced with short fibers. Such a material is generally preferable to metal because of the risk of the corrosion of metal caused by the engine coolant. The material gives the heat exchanger device a low thermal conductivity across the mass of the polymer material of the external envelope element 6 intimately surrounding the exchanger coil 7, which coil preferably consists of a metal tube. As shown, the thickness of the central cylindrical portion 12 of the external envelope element 6 may be between about 1 and about 4 centimeters, while that of the rest of the external envelope element 6 may be between about 0.5 and about 2 centimeters.

In reality, despite the above-mentioned low thermal conductivity, the heating or calorific capacities involved are such that it is generally not necessary to attempt to improve the thermal conductivity of the polymer materials, such as, for example, by the incorporation of appropriate additives. The reason for this is that the polymer materials used for the rigid internal tubing 1 are generally bathed in a strong flow of the engine coolant fluid, and the heat exchanger assembly is, in general, continuously at the temperature of the engine coolant. The heat exchanger assembly is therefore lent a substantial degree of thermal stability. Such thermal stability could not generally be supplied by a metal casing, as a metal casing may generally be subject to rapid temperature variations in the coolant fluid.

In operation, the generally low flow rate of the windshield washer fluid, which has remained in the exchanger coil 7 for a long time and has thus been heated, may be altogether incapable of significantly cooling the walls of the exchanger coil 7. In other words, because of the relatively low flow rate of the windshield washer fluid during operation, a quantity of windshield washer fluid may remain in the exchanger coil for a relatively long period of time. In this way, this quantity of fluid remains substantially heated while in the exchanger coil 7, thus preventing any substantial cooling of the walls of the coil.

In addition, the temperature regulation system usually provided on the engine make sit generally impossible for the windshield washer fluid to boil. In many cases, boiling is prevented even if an addition of a great deal of alcohol is used in the windshield washer circuit both for antifreeze properties and for cleaning ability. Thus, the heat exchanger according to the invention is preferably located in a priority circuit of the passenger compartment generally not used during warm weather, or even in the carburetor preheating circuit, which is generally fed in priority in relation to the radiator.

For these various reasons, the line or hose most frequently includes, at this point, either a "T" tap having a diameter smaller than that of the principal circuit, or bleed screws frequently located at a higher point, near the windshield washer tubes.

FIG. 4, again in axial section, shows a particular arrangement, on the cooling circuit, of a tap of a bypass intended for heating the passenger compartment. In certain coolant circuit applications, such as that shown in FIG. 4, the balancing of flows generally requires the creation of a loss of head by means of a small-diameter diaphragm or other constriction in the rigid internal tubing 1. The diaphragm is preferably fitted in the rigid internal tubing 1 when a lateral tap 13 diverts a portion of the principal flow carried by the flexible input hose 2. The partial, diverted flow returns via the return tap 14 and rejoins the flexible output line 3.

Figure 4:
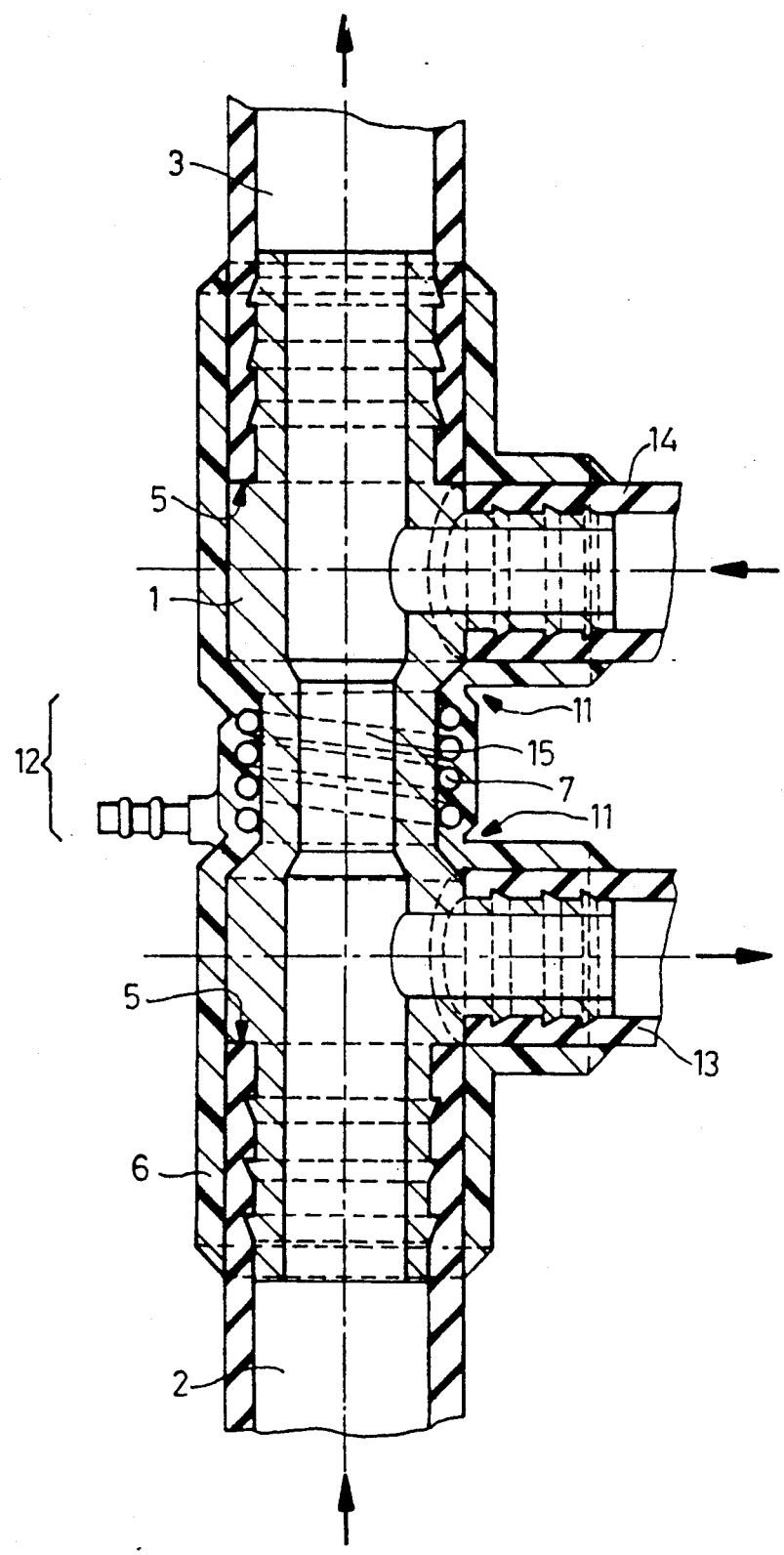
FIG. 4 shows a tap on the cooling circuit including inlet and return lines leading from a bypass designed to heat the passenger compartment, wherein the internal tubing of the bypass is equipped with a heat exchanger coil according to the invention.

In the example of FIG. 4, it may be seen that, because of the need for a small-diameter diaphragm or the like, there is preferably a central contracted zone 15 in the rigid internal tube 1. Thus, it is quite natural to make use of this contracted zone 15 to install the exchanger coil 7, preferably by means of an increase in length of not more than about two centimeters over the length strictly necessary. In this application, the exchanger coil 7 is preferably coiled or wound on the rigid internal tubing 1, prior to assembly, by plastic deformation over the contracted zone 15. The contracted zone 15 is limited by two shoulders included between the two flexible hoses 2 and 3 of the principal circuit.

The grooves 11, as shown in FIG. 4, may prove to be useful if the external envelope element 6 is made of a polymer material having a significant thermal shrinkage during manufacture, such that geometric blockage caused by such thermal shrinkage around elements with different volumetric elasticities is usually avoided.

The "French horn" configuration of the heat exchanger coil 7, having been preferably formed by a winding machine using tube sections previously cut to the desired length, perhaps with a limited precision, is preferably clamped in place by closing the mold forming the external envelope element 6. Nevertheless, the reciprocal or mutual orientation of the tangential outlets 9 and of the axis of the taps 13 and 14 is preferably different, in order to allow the installation of the flexible hoses 2 and 3 on the taps 13 and 14.

Figure 5A:
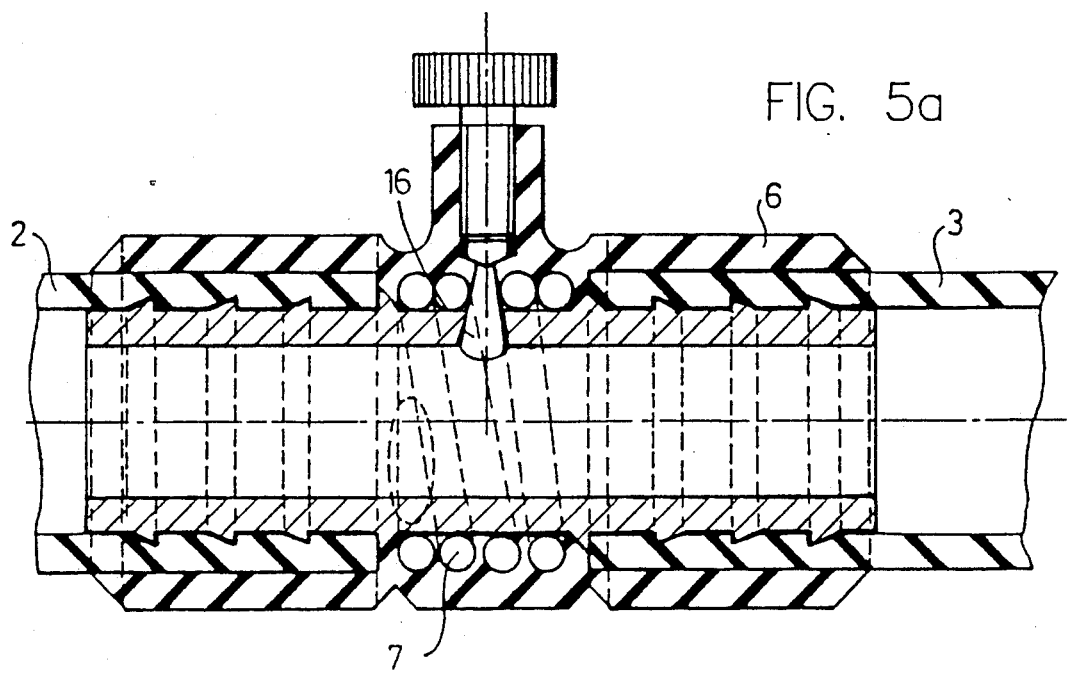
Figure 5B:
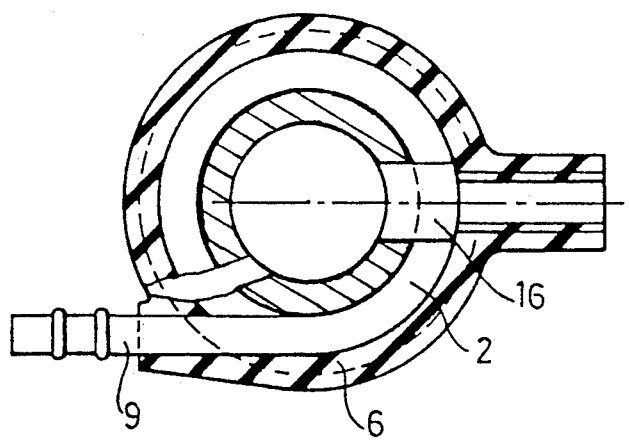

FIGS. 5a and 5b, under substantially the same geometric conditions as the preceding variants, illustrate a case at a higher point of the engine cooling circuit, wherein an air bleed screw may be required. An exchanger coil 7 can then be used, with primarily the only condition being that between the coiled turns of the exchanger coil 7, a passage 16 is preferably left open in the rigid internal tubing 1. Such a passage may be created by utilizing an additional core in the mold used for the production of the external envelope element 6. In this way, the additional passage 16 is formed when the core is removed after molding.

Also, one solution can take advantage of the inherent, natural elasticity of the "French horn" configuration of the heat exchanger coil 7 wound in approximately contiguous spirals on either side of a removable core. In this case, the core, enclosed in the mold, may be in the shape of a needle or a flat blade. In FIG. 5a, for example, the passage 16, left open by the elastic difference between turns, need not exceed a few millimeters.

FIG. 5b is a partial orthogonal section showing that the passage 16, as shown in FIG. 5a can have a significantly larger dimension in the circumferential direction by virtue of the use of a flat core, which core can be retracted during unmolding in a direction toward the axis of the tubing, and which also comes into contact with another core designed to start the hole for the bleed screw, even if this hole must be larger than the width of the flat core. The turns of the exchanger coil 7 surrounding the passage 16 can be made contiguous by pushing the turns together during assembly of the flexible hoses 2 and 3. The turns are then blocked or filled in by the molding of the polymer material constituting the external envelope element 6.

Figure 6A:
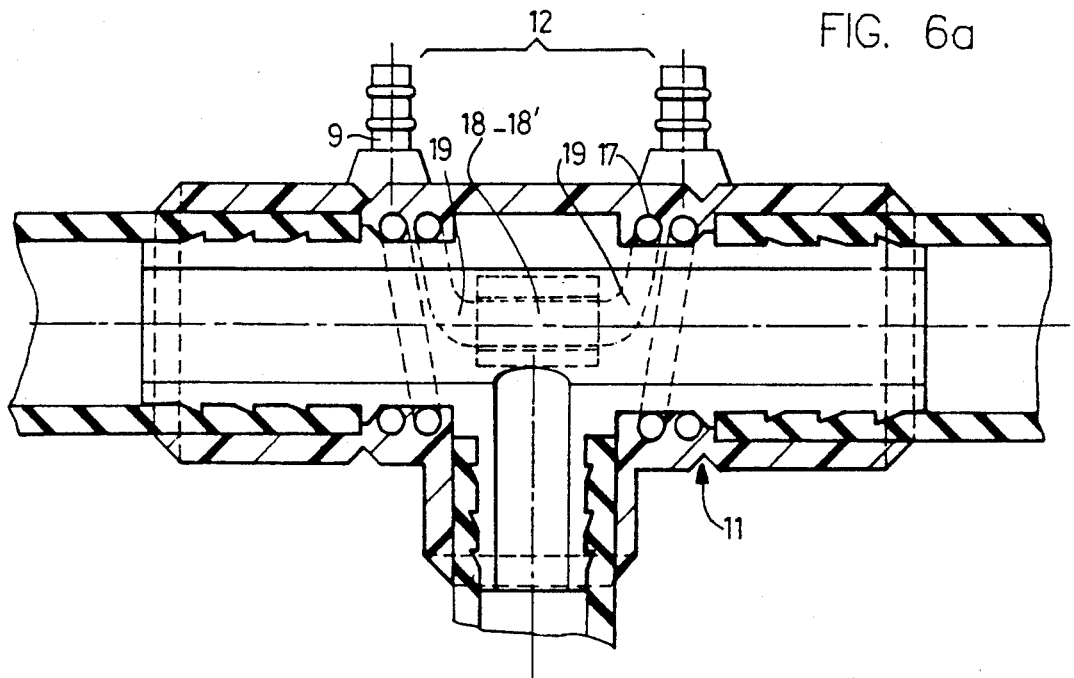
Figure 6B:
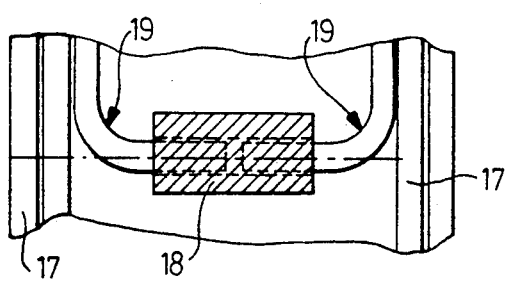
Figure 6C:
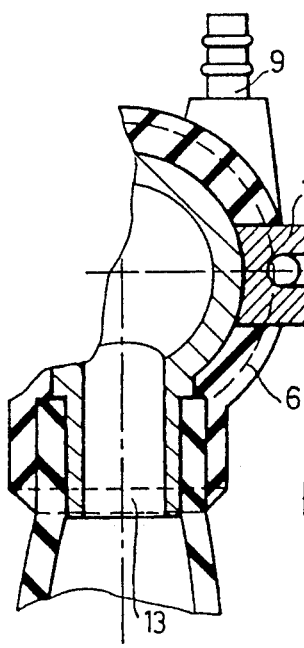

The spirals of the small-diameter, preferably metal tube designed to form the exchanger coil 7 could therefore be identical for a large number of variants, making the incorporation of the heat exchanger in several types of connections all the more economical. FIGS. 6a, 6b and 6c show a variant in which the exchanger coil 17 must leave room, over a space of several centimeters, for a single lateral tap 13. One of the solutions, represented in FIG. 6a, is to engage two "French horn" configurations over the central cylindrical portion 12 of the internal rigid tubing 1, on each side of the lateral tap 13. Each tangential outlet 9, on the external side, is held in the mold forming the external envelope element 6 in the same manner as described above, and two central outlets 19, preferably located on the interior side, on either side of the lateral tap 13, are connected together, during assembly, by a connector 18 or 18' and are then embedded, during the molding process, in the polymer material which constitutes the external envelope element 6.

This method makes it possible, without a major modification of the production mold, for the connector 18 or 18' either to substantially consist only of one substantially cylindrical part parallel to the axis of the rigid internal tube, or to have the shape of a "T", with an end piece similar to that of the tangential outlets 9.

In the first case, illustrated in FIG. 6b, the spiral portions of the exchanger coil 17, which, for example, are each constituted by two and one-half turns of rigid tube, are preferably arranged in series and placed end-to-end, in which the ends or extremities 19 of each spiral are connected together via the hole in the connector 18. Preferably, one input and one output for the windshield washer fluid, by way of the two tangential outlets 9, are interposed on the windshield washer lines connecting the pump to the wiper, or perhaps to a "T", specified by the designer, between two wipers.

The second case, illustrated by FIG. 6c, is a method of incorporating this latter "T" in the assembly described above, where a connector 18' is preferably used as a bypass for two symmetrical washer fluid circuits which carry the parallel flow of the windshield washing fluid to two nozzles, at the lowest cost.

The improvised, complete seal achieved during the assembly process, in which the central outputs 19 of the two spiral parts are bent in a square fashion in relation to the exchanger coil 17 and disposed in the hole in the connector 18 or 18', is achieved by embedding the connection in the polymer material during the molding of the external envelope element 6. The grooves 11 are then able to compensate for differences in the elastic deformability of different parts of the external envelope element 6.

The preferred manufacturing processes for a windshield washer fluid heater according to the invention are a function of the inherent characteristics of the finished product. In each case, the rigid internal tubing is preferably made of a composite material which is substantially resistant to pressure at temperatures above 200° C., which material is preferably a 6—6 polyamide reinforced with short fibers.

In one variant, the exchanger coil is preferably wound on the rigid internal tubing and, in another variant, it is preferably wound on a mandrel of an appropriate diameter and then engaged later over the rigid internal tubing during the preparation. The flexible hoses are then engaged on the rigid internal tubing until they are in contact with the exchanger coil.

Preferably, the next operation is the molding of the polymer material to produce the external envelope element. The almost instantaneous cooling allows a rapid molding cycle, as a function of the type of polymer material, on mass production machines, which differ only in the molds appropriate to each application. The molding of the external envelope element is preferably done with a seal between the mold and the flexible hoses, such that the seal can then exit freely from the molds.

The windshield washer fluid heater, which is the object of the present invention, has the following advantages over the devices of the known art:
- it is integrated in a connection device of the flexible hoses of the engine cooling circuit, and therefore does not entail any extra cost either for the installation of accessories for the cooling circuit or for any modification thereof;
- it is embedded in polymer material constituting the external envelope element, and, therefore, is well protected; it guarantees reliability, requires substantially no maintenance, and is sheltered from possible damage during engine repairs;
- by making use of the engine cooling circuit, it requires neither electrical resistance nor safety equipment, thereby substantially limiting the risks for the user.

In summary, the windshield washer fluid heater, which is the object of the present invention, represents a convenience for the automobile driver, combining safety and reliability at low cost.

The different combinations of variants described above allow a technician skilled in the art to meet the requirements of substantially all configurations required by automotive designers, without going beyond the context of the invention.

In summary, one feature of the invention resides broadly in a windshield washer fluid heater on the engine coolant circuit for an automotive vehicle comprising at least one exchanger coil made of metal tube wound in a spiral fashion around the hose through which the coolant fluid circulates, the circuit comprising a bypass and/or connection device for flexible hoses 2 and 3 mounted between an internal rigid tubing 1 and an external envelope element 6, which is made of an elastomeric, thermoplastic or thermosetting polymer material, the windshield washer fluid heater being characterized by the fact that the exchanger coil 7 or 17, located around the rigid internal tubing 1, is embedded in the polymer material constituting the external envelope element 6.

Another feature of the invention resides broadly in a windshield washer fluid heater, characterized by the fact that the exchanger coil 7 or 17 serves as a stop for the two flexible hoses 2 and 3 connected by the rigid internal tubing 1, before being embedded in the polymer material, which then forms the cylindrical shoulder 5, which serves as a confinement for said flexible hoses 2 and 3.

Yet another feature of the invention resides broadly in a windshield washer fluid heater, characterized by the fact that the exchanger coil 17 consists of two spirals of rigid tube operating in parallel, on account of their "T" connection by a connector 18' on the windshield washer fluid circuit.

A further feature of the invention resides broadly in a windshield washer fluid heater, characterized by the fact that the grooves 11 on the exterior surface of the external envelope element 6 make it possible to compensate for differences in elastic deformability in the overlapping zones of the flexible hoses 2 and 3 and in the central cylindrical portion 12 containing, embedded, the exchanger coil 7 or 17 when the external envelope element 6 consists of a thermoplastic polymer material which experiences significant shrinkage during cooling.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incomparable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modification and variations thereof may be made without departing from the spirit and scope of the invention.

What is claimed is:

1. A windshield washer system for a motor vehicle having an internal combustion engine with an engine coolant system for cooling the engine and for directing heated fluid to a heat exchanger, said coolant system having a plurality of coolant hoses and at least one connection device for connecting at least two of said coolant hoses, said windshield washer system comprising a hose arrangement for conducting windshield washer fluid to a windshield, said windshield washer system comprising:
   said washer fluid hose arrangement being configured to interface with said coolant system at least at one of said at least one connection device;
   said washer fluid hose arrangement comprising at least one heat exchanger coil for transferring heat from said coolant system to said washer fluid hose arrangement;
   said coolant system comprising at least a first coolant hose end and a second coolant hose end;
   at least one of said at least one connection device comprising an internal tube connecting at least said first coolant hose end and said second coolant hose end;
   at least one of said at least one connection device comprising an external envelope disposed about said first coolant hose end, said second coolant hose end and said internal tube and over at least a substantial portion of each of said first coolant hose end and said second coolant hose end;
   said at least one heat exchanger coil being disposed around said internal tube and being disposed adjacent said internal tube along a substantial length of said at least one heat exchanger coil;
   a substantial portion of said at least one heat exchanger coil being substantially embedded within said external envelope;
   said first coolant hose end and said second coolant hose end being held substantially within said external envelope;
   said at least one heat exchanger coil comprising at least one coil body, each said at least one coil body being in the form of a spiral;
   said external envelope having a central section between said first coolant hose end and said second coolant hose end;
   said central section of said external envelope contacting said internal tube over a large surface area of said internal tube; and
   said at least one coil body being completely embedded within said external envelope such that said external envelope is disposed substantially completely around said at least one coil body.

2. The windshield washer system according to claim 1, wherein said internal tube comprises a substantially rigid material.

3. The windshield washer system according to claim 2, wherein said external envelope comprises a polymer material.

4. The windshield washer system according to claim 3, further comprising:
   said substantially rigid material of said internal tube being a polymer material;
   said polymer material of said internal tube being a 6—6 polyamide reinforced with short fibers;
   said internal tube comprising a plurality of circumferentially disposed protrusions for securely holding said first hose end and said second hose end;
   said external envelope comprising a plurality of outer sections;
   said central section of said external envelope being disposed between two circumferentially disposed grooves;
   said grooves being disposed between said center section and at least one of said outer sections;
   said grooves being for compensating differences in elastic deformability between said sections of said external envelope;
   said heat exchanger coil comprising a first tangential outlet and a second tangential outlet;
   said first tangential outlet and said second tangential outlet being oriented in a substantially tangential direction with respect to said coil body;
   at least a portion of each of said first and second tangential outlets being embedded in said external envelope;
   each of said first and second tangential outlets comprising a plurality of circumferentially disposed protrusions;
   said hose arrangement comprising a plurality of windshield washer fluid hoses;
   said circumferentially disposed protrusions securely holding at least one of said windshield washer fluid hose;
   said polymer material of said external envelope comprising at least one of:
      an elastomer;
      a thermoplastic; and
      a thermosetting polymer;
   said internal tube comprising a first outlet and a second outlet;
   a third hose end being disposed to surround at least a portion of said first outlet of said internal tube;
   a fourth hose end being disposed to substantially surround at least a portion of said second outlet of said internal tube;
   said external envelope being disposed around said third hose end and said fourth hose end;
   said at least one heat exchanger coil being disposed between said first outlet and said second outlet of said internal tube;
   said internal tube having a varying diameter;
   the diameter of said internal tube being smaller between said first outlet and said second outlet than at said first end and said second end of said internal tube;
   said at least one heat exchanger coil comprising a plurality of coil turns;
   said internal tube comprising a central outlet;
   said central outlet being disposed between two of said coil turns;
   an additional hose end being disposed to surround at least a portion of said central outlet of said internal tube;
   said external envelope being disposed around said additional hose end;
   said internal tube having a longitudinal axis; and
   each of said first outlet, said second outlet and said central outlet of said internal tube being disposed in a substantially perpendicular direction with respect to the longitudinal axis of said internal tube.

5. A windshield washer system hose connector for connecting sections of hose in an engine cooling system for a motor vehicle having a windshield washer system, which windshield washer system comprises an arrangement of windshield washer fluid hoses for providing windshield washer fluid to a windshield, said hose connector comprising:
   an internal tube for connecting a first hose end and a second hose end;
   said hose connector being configured to receive the first hose end and the second hose end;
   said internal tube comprising a first end a second end;
   said first hose end for being disposed to substantially surround at least a portion of said first end of said internal tube;
   said second hose end for being disposed to substantially surround at least a portion of said first end of said internal tube;
   an external envelope being disposed around said internal tube;
   said external envelope for being disposed around the first hose end and the second hose end and over at least a substantial portion of each of said first hose end and said second hose end;
   at least one heat exchanger coil for containing windshield washer fluid, said at least one heat exchanger coil being disposed around said internal tube to receive heat from said internal tube for heating the windshield washer fluid;
   said at least one heat exchanger coil being disposed adjacent said internal tube along a substantial length of said at least one heat exchanger coil;
   said at least one heat exchanger coil for being disposed between the first hose end and the second hose end;
   a substantial portion of said at least one heat exchanger coil being embedded within said external envelope;
   said first hose end and said second hose end for being held substantially within said external envelope;
   said at least one heat exchanger coil comprising at least one coil body, each said at least one coil body being in the form of a spiral;
   said external envelope having a central section between said first coolant hose end and said second coolant hose end;
   said central section of said external envelope contacting said internal tube over a large surface area of said internal tube; and
   said at least one coil body being completely embedded within said external envelope such that said external envelope is disposed substantially completely around said at least one coil body.

6. The windshield washer system hose connector according to claim 5, wherein said internal tube comprises a substantially rigid material.

7. The windshield washer system hose connector according to claim 6, wherein said external envelope comprises a polymer material.

8. The windshield washer system hose connector according to claim 7, wherein at least a portion of each of said first and second coolant hose ends is for being disposed directly adjacent said at least one heat exchanger coil.

9. The windshield washer system hose connector according to claim 9, further comprising:
   said internal tube comprising a first outlet and a second outlet, each of said first outlet and said second outlet being disposed between said first end and said second end of said internal tube;
   said hose connector being configured to receive a third hose end and a fourth hose end, said third hose end for being disposed to surround at least a portion of said first outlet of said internal tube, said fourth hose end for being disposed to substantially surround at least a portion of sad second outlet of said internal tube;
   said external envelope for being disposed around said third hose end and said fourth hose end and over a substantial portion of each of said third hose end and said fourth hose end;
   said third hose end and said fourth hose end for being held substantially within said external envelope;
   said at least one heat exchanger coil being disposed between said first outlet and said second outlet of said internal tube;
   said internal tube having a varying diameter;
   the diameter of said internal tube being smaller between said first outlet and said second outlet than at either of said first end and said second end.

10. The windshield washer system hose connector according to claim 7, further comprising;
    said hose connector comprising coolant valve means, said coolant valve means comprising a valve passage;
    said at least one heat exchanger coil comprising a plurality of coil turns;
    said valve passage being disposed between two of said coil turns.

11. The windshield washer system hose connector according to claim 7, further comprising:
    said internal tube comprising a central outlet;
    said hose connector being configured to receive a third hose end, said third hose end for being disposed to surround at least a portion of said central outlet of said internal tube;
    said external envelope for being disposed around said third hose end and over at least a substantial portion of said third hose end;
    said third hose end for being held substantially within said external envelope;
    said at least one heat exchanger coil comprising a first heat exchanger coil and a second cheat exchanger coil, each of said first and second heat exchanger coils having a first end and a second end;
    said first end of said first heat exchanger coil and said second end of said second heat exchanger coil each comprising a heat exchanger coil outlet;
    means for connecting said second end of said first heat exchanger coil ad said first end of said second heat exchanger coil;
    said first heat exchanger coil being disposed between said first end of said internal tube and said connecting means;
    said second heat exchanger coil being disposed between said second end of said internal tube and said connecting means.

12. The windshield washer system hose connector according to claim 8, further comprising:
    said at least one heat exchanger coil comprising a singular heat exchanger coil;
    said singular heat exchanger coil comprising three and one half turns;
    said substantially rigid material of said internal tube being a polymer material;
    said polymer material of said internal tube being a 6—6 polyamide reinforced with short fibers;
    said internal tube comprising a plurality of circumferentially disposed protrusions for securely holding said first hose end and said second hose end;
    said external envelope comprising a plurality of outer sections;
    said central section of said external envelope being disposed between two circumferentially disposed grooves;
    said grooves being disposed between said center section and at least one of said outer sections;
    said grooves being for compensating differences in elastic deformability between said sections of said external envelope;
    said outlets of said heat exchanger coil comprising a first tangential outlet and a second tangential outlet;
    said first tangential outlet and said second tangential outlet being oriented in a substantially tangential direction with respect to said coil body;
    at least a portion of each of said first and second tangential outlets being embedded in said external envelope;
    said central section of said external envelope comprising a first shoulder and a second shoulder;
    said first shoulder for being disposed between at least a portion of said first hose end and said heat exchanger coil;
    said second shoulder for being disposed between at least a portion of said second hose end and said heat exchanger coil;
    each of said first and second tangential outlets comprising a plurality of circumferentially disposed protrusions;
    said circumferentially disposed protrusions for securely holding at least one of said windshield washer fluid hoses; and
    said polymer material of said external envelope comprising at least one of:
    an elastomer;
    a thermoplastic; and
    a thermosetting polymer.

13. A method of making a windshield washer system hose connector for connecting sections of hose in an engine cooling system for a motor vehicle having a windshield washer system, which windshield washer system comprises an arrangement of windshield washer fluid hoses for providing windshield washer fluid to a windshield, the washer fluid hose arrangement being configured to interface with the coolant system at least at the hose connector, the washer fluid hose arrangement comprising at least one heat exchanger coil for transferring heat from the coolant system to the washer fluid hose arrangement, the coolant system comprising at least a first coolant hose end and a second coolant hose end, the hose connector comprising:

an internal tube having a first end and a second end, the internal tube connecting at least the first coolant hose end and the second coolant hose end;

an external envelope disposed about the first coolant hose end, the second coolant hose end and the internal tube;

the at least one heat exchanger coil being disposed around the internal tube and being disposed adjacent the internal tube along a substantial length of the at least one heat exchanger coil; and a substantial portion of the at least one heat exchanger coil being substantially embedded within the external envelope;

said method of making the hose connector comprising the steps of:

disposing the at least one heat exchanger coil around the internal tube and adjacent the internal tube along a substantial length of the at least one heat exchanger coil;

mounting the first coolant hose end on the first end of the internal tube;

mounting the second coolant hose end on the second end of the internal tube;

the at least one heat exchanger coil being disposed between the first coolant hose end and the second coolant hose end;

placing the first coolant hose end, the second coolant hose end, the internal tube and at least a substantial portion of the at least one heat exchanger coil in a mold;

injecting a plastic material into the mold such that the plastic material flows:

between the turns of the at least one heat exchanger coil;

over a substantial portion of the at least one heat exchanger coil;

over at least a substantial portion of the first coolant hose end;

over at least a substantial portion of the second coolant hose end; and about the internal tube; and hardening the plastic material in the mold to hold the at least one heat exchanger coil, the first coolant hose end, the second coolant hose end and the internal tube substantially within the external envelope.

14. The method according to claim 13, wherein the windshield washer fluid hose connector further comprises said at least one heat exchanger coil comprising at least one coil body, said at least one coil body being in the form of a spiral, said method further comprising:

said step of injecting the plastic material into the mold including completely embedding the at least one coil body within the external envelope; and said step of hardening the plastic material in the mold being for holding the at least one coil body completely within the external envelope.

15. The method according to claim 14, wherein the internal tube comprises a substantially rigid material.

16. The method according to claim 15, wherein the external envelope comprises a polymer material.

17. The method according to claim 15, wherein the windshield washer system hose connector further comprises:

the external envelope comprising a plurality of sections including at least a central section and a plurality of outer sections;

the central section being disposed between two circumferentially disposed grooves, each of said grooves being disposed between the center section and at least one of the outer sections;

said method further comprising:

forming the grooves about the external envelope such that the grooves compensate for differences in elastic deformability between the sections of the external envelope.

18. The method according to claim 17, wherein the windshield washer system hose connector further comprises:

the substantially rigid material of the internal tube being a polymer material;

the polymer material of the internal tube being a 6—6 polyamide reinforced with short fibers;

the internal tube comprising a plurality of circumferentially disposed protrusions for securely holding the first hose end and the second hose end;

the heat exchanger coil comprising a first tangential outlet and a second tangential outlet;

the first tangential outlet and the second tangential outlet being oriented in a substantially tangential direction with respect to said coil body;

each of the first and second tangential outlets comprising a plurality of circumferentially disposed protrusions;

the circumferentially disposed protrusions of the tangential outlets being for securely holding at least one of the windshield washer fluid hoses;

the polymer material of the external envelope comprising at least one of:

an elastomer;

a thermoplastic; and a thermosetting polymer;

the internal tube comprising a first outlet, a second outlet and a central outlet;

the hose connector being configured to receive a third coolant hose end and a fourth coolant hose end;

the hose connector being configured to receive an additional hose end;

the at least one exchanger coil being disposed between the first outlet and the second outlet of the internal tube;

the internal tube having a varying diameter;

the at least one heat exchanger coil comprising a plurality of coil turns;

the central outlet being disposed between two of the coil turns of the at least one heat exchanger coil;

the at least one heat exchanger further comprising a "T" connection, the "T" connection being disposed between two turns of the at least one heat exchanger coil, the "T" connection being for conducting windshield washer fluid to an additional windshield washer fluid hose;

said internal tube having a longitudinal axis; and each of said first outlet, said second outlet and said central outlet of said internal tube being disposed in a substantially perpendicular direction with respect to the longitudinal axis of said internal tube;

said method further comprising:

providing at least one substantially long metal tube for being coiled to form the at least one heat exchanger coil;

said step of disposing the at least one heat exchanger coil around the internal tube including at least one of:

at least partly coiling the at least one metal tube and subsequently mounting the at least partly coiled metal tube about the internal tube; and coiling the at least one metal tube about the internal tube;

mounting the third coolant hose end on the first outlet of the internal tube;

mounting the fourth coolant hose end on the second outlet of the internal tube;

mounting the additional hose end on the central outlet of the internal tube;

additionally placing the third coolant hose end, the fourth coolant hose end and the additional hose end in the mold;

said step of placing the at least a substantial portion of the at least one heat exchanger coil into the mold including securing each of the first and second tangential outlets of the at least one heat exchanger coil in a substantially fixed position;

placing a removable core in the mold to form a passage for the central outlet;

said step of injecting the plastic material into the mold further including injecting the plastic material into the mold such that the plastic material additionally flows:

over at least a portion of each of the first and second tangential outlets;

over a substantial portion of the third coolant hose end;

over a substantial portion of the fourth coolant hose end;

over a substantial portion of the additional hose end; and about the removable core;

said step of hardening the plastic material in the mold further including hardening the plastic material in the mold to hold at least a portion of each of the first and second tangential outlets, the third coolant hose end, the fourth coolant hose end and the additional hose end substantially within the external envelope;

removing the removable core from the mold to create the passage for the central outlet;

mounting at least one windshield washer fluid hose on each of the fist and second tangential outlets such that the circumferentially disposed protrusions of each of the first and second tangential outlets securely hold the at least one windshield washer fluid hose; and mounting the additional windshield washer fluid hose on the "T" connection.

* * * * *

UNITED STATES PATENT AND TRADEMARK OFFICE
CERTIFICATE OF CORRECTION

PATENT NO. : 5,183,099

DATED : February 2, 1993

INVENTOR(S) : Jean-Pierre BECHU

It is certified that error appears in the above-identified patent and that said Letters Patent is hereby corrected as shown below:

In column 13, line 43, Claim 4, delete "hose" and insert --hoses--.

In column 14, line 24, Claim 5, after the first occurrence of "end", insert --and--.

In column 14, line 29, Claim 5, after 'said', delete "first" and insert --second--.

In column 15, line 10, Claim 9, after 'claim', delete "9" and insert --7--.

In column 15, line 20, Claim 9, after 'of', delete "sad" and insert --said--.

In column 20, line 20, Claim 18, after 'the', delete "fist" and insert --first--.

Signed and Sealed this

Third Day of May, 1994

*Attest:*

BRUCE LEHMAN

*Attesting Officer*  Commissioner of Patents and Trademarks